United States Patent
Brown et al.

(10) Patent No.: US 11,668,882 B2
(45) Date of Patent: Jun. 6, 2023

(54) CLEANING NOZZLE AND NOZZLE ASSEMBLY AND CLEANING METHODS FOR OPTICAL FIBER CONNECTORS

(71) Applicant: CORNING OPTICAL COMMUNICATIONS LLC, Charlotte, NC (US)

(72) Inventors: James Michael Brown, Elmira, NY (US); Yuehao Li, Painted Post, NY (US); Elias Panides, Horseheads, NY (US); Jingru Zhang, Enfield, CT (US); Yi Zhang, Painted Post, NY (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 17/174,836

(22) Filed: Feb. 12, 2021

(65) Prior Publication Data

US 2021/0173153 A1 Jun. 10, 2021

Related U.S. Application Data

(62) Division of application No. 15/798,983, filed on Oct. 31, 2017, now Pat. No. 10,955,624.

(Continued)

(51) Int. Cl.
*B08B 3/02* (2006.01)
*B08B 3/08* (2006.01)
(Continued)

(52) U.S. Cl.
CPC .............. *G02B 6/3866* (2013.01); *B08B 3/02* (2013.01); *B08B 3/08* (2013.01); *B08B 5/02* (2013.01); *B08B 2240/02* (2013.01)

(58) Field of Classification Search
CPC ......... B08B 2240/02; B08B 3/02; B08B 3/08; B08B 5/02; G02B 6/3866
See application file for complete search history.

(56) References Cited

U.S. PATENT DOCUMENTS

| | | | | |
|---|---|---|---|---|
| 3,807,632 A | * | 4/1974 | Johnson, Jr. | E21B 7/185 239/290 |
| 4,733,428 A | * | 3/1988 | Malinge | G02B 6/3866 15/345 |

(Continued)

FOREIGN PATENT DOCUMENTS

| | | |
|---|---|---|
| CA | 2489838 A1 | 1/2004 |
| CN | 1668952 A | 9/2005 |

(Continued)

OTHER PUBLICATIONS

Machine translation of JP10-57845A (Year: 1998).*

(Continued)

*Primary Examiner* — Douglas Lee

(57) ABSTRACT

A cleaning nozzle includes an outer housing having a central axis and an inner surface that defines an outer housing interior. An inner housing resides within the outer housing interior along the central axis and has an inner surface that defines an inner flow channel. The inner flow channel supports flow of the cleaning fluid and has a converging taper and a flow disrupter element. The nozzle assembly may include an adapter that receives a front end of the nozzle and that also holds a ferrule that supports an optical fiber having an end face. The nozzle assembly allows the nozzle to direct a jet stream of cleaning fluid to the ferrule end face and the fiber end face. The flow disrupter causes the jet stream to have a time-varying direction that enhances the cleaning of the ferrule end face and the optical fiber end face.

10 Claims, 10 Drawing Sheets

Related U.S. Application Data

(60) Provisional application No. 62/417,687, filed on Nov. 4, 2016.

(51) Int. Cl.
*B08B 5/02* (2006.01)
*G02B 6/38* (2006.01)

(56) References Cited

U.S. PATENT DOCUMENTS

| | | | |
|---|---|---|---|
| 6,810,552 | B2 | 11/2004 | Miyake et al. |
| 6,821,025 | B2 | 11/2004 | Gerhard |
| 6,853,794 | B2 | 2/2005 | Lu et al. |
| 7,147,386 | B2 | 12/2006 | Zhang et al. |
| 7,147,490 | B2 | 12/2006 | Gerhard |
| 7,232,262 | B2 | 6/2007 | Lytle et al. |
| 7,566,176 | B2 | 7/2009 | Lytle et al. |
| 2002/0131748 | A1 | 9/2002 | Sato |
| 2003/0221706 | A1 | 12/2003 | Kiani et al. |
| 2004/0005134 | A1* | 1/2004 | Sun ............... G02B 6/3866 385/134 |
| 2004/0013370 | A1 | 1/2004 | Gerhard |
| 2004/0033050 | A1 | 2/2004 | Lytle et al. |
| 2005/0105859 | A1 | 5/2005 | Gerhard |
| 2006/0171641 | A1 | 8/2006 | Zhang et al. |
| 2007/0034227 | A1 | 2/2007 | Hesch et al. |
| 2007/0196056 | A1 | 8/2007 | Gerhard |
| 2007/0243008 | A1 | 10/2007 | Vogt |
| 2008/0152284 | A1 | 6/2008 | Lytle et al. |
| 2015/0360263 | A1* | 12/2015 | Kakutani ............ B05B 1/005 15/319 |

FOREIGN PATENT DOCUMENTS

| | | |
|---|---|---|
| CN | 100376910 C | 3/2008 |
| CN | 203253667 U | 10/2013 |
| CN | 103861845 A | 6/2014 |
| DE | 102005030928 A1 | 1/2007 |
| JP | 10-057845 A | 3/1998 |
| JP | 10057845 A * | 3/1998 |
| WO | 2004/010189 A1 | 1/2004 |
| WO | 2008/072822 A1 | 6/2008 |

OTHER PUBLICATIONS

Abstract of JP10-57845A (Year: 1998).*
International Search Report and Written Opinion of the International Searching Authority;PCT/US2017/059226; dated Mar. 13, 2018, 15 pages; European Patent Office.
Roshko; "Experiments on the Flow Past a Circular Cylinder at Very High Reynolds Number" J. Fluid Mech., 10; pp. 345-356; Received Nov. 15, 1960.
Schewe; "On the Force Fluctuations Acting On a Circular Cylinder in Cross-Flow From Subcritical up to Transcritical Reynolds Numbers", J. Fluid Mech., 133; pp. 265-285; (1983).
Wikipedia, "Laminar-turbulent transition" Oct. 26, 2016, retrieved from: URL: https://en.wikipedia.org/w/index.php?title=Laminar-turbulent_transition&oldid=746332171.
Williamson; "Oblique and Parallel Modes of Vortex Shedding in the Wake of a Circular Cylinder at Low Reynolds Number", J. Fluid Mech., 206; 579-627 (1989).

* cited by examiner

CLEANING NOZZLE AND NOZZLE ASSEMBLY AND CLEANING METHODS FOR OPTICAL FIBER CONNECTORS

CROSS-REFERENCE TO RELATED APPLICATION

This application is a divisional of U.S. application Ser. No. 15/798,983, filed on Oct. 31, 2017, which claims the benefit of priority to U.S. Application No. 62/417,687 filed on Nov. 4, 2016, both applications being incorporated herein by reference.

FIELD

The present disclosure relates to optical fiber connectors and in particular to a cleaning nozzle and nozzle assembly and cleaning methods for optical fiber connectors.

BACKGROUND

Optical fiber connectors are used to optically couple at least two lengths of optical fibers. To this end, an optical fiber connector includes a ferrule that supports an end portion of at least one optical fiber. The end portion of each optical fiber has a polished end face that resides substantially at the front end of the ferrule. When two optical fiber connectors are operably engaged, the end faces of the corresponding optical fibers are placed in close proximity and in a confronting orientation to facilitate the communication of light from one fiber to the other through the fiber end faces.

The end faces of the optical fibers need to be kept clean to ensure optimum optical transmission and to avoid damage to the optical fibers when they are placed into close proximity using optical connectors. Methods for fiber optic cleaning include both dry cleaning and wet cleaning. There are also contact and non-contact cleaning methods. One of the non-contact cleaning methods uses an impingement jet to deliver high speed air mixed with a solvent to clean the front end of the ferrule. The shear force generated from the impingement jet, combined with the optional chemicals in the solvent, removes particles adhered to the front end of the ferrule.

For an axisymmetric, normally impinging jet, the shear force at the center of the front end of the ferrule where the fiber end face is located is relatively low due to the existence of a stagnation zone. For a non-axisymmetric, off-center aligned or tilted impingement jet, the stagnation zone still exists somewhere on the ferrule front end.

SUMMARY

An embodiment of the disclosure is a nozzle for cleaning an end face of a ferrule using a cleaning fluid. The nozzle includes: an outer housing comprising a central axis and an inner surface that defines an outer housing interior; an inner housing that resides within the outer housing interior along the central axis, the inner housing comprising an inner surface that defines an inner flow channel that supports flow of the cleaning fluid, the inner flow channel including a converging taper; and at least one flow disrupter element disposed in the inner flow channel.

Another embodiment of the disclosure is a nozzle assembly that includes the nozzle described above, and further includes: an adapter comprising an adapter front end and an adapter interior configured to support the nozzle, the adapter front end including an adapter channel open to a front-end portion of the adapter interior; a ferrule supported in the adapter channel, the ferrule including a ferrule end face spaced apart from the nozzle inner housing through the front-end portion of the adapter interior; and an optical fiber comprising a front-end section with a fiber end face, the front end section of the optical fiber being supported by the ferrule so that the fiber end face resides substantially at the ferrule end face.

Another embodiment of the disclosure is a method of cleaning a fiber end face of an optical fiber supported by a ferrule substantially at a ferrule end face. The method includes: flowing a cleaning fluid through a flow channel from an input end of the flow channel toward a convergent output end of the flow channel; flowing the cleaning fluid around at least one flow disrupter element that resides stationary in the flow channel to form a disrupted flow of the cleaning fluid; and passing the disrupted flow of the cleaning fluid through the convergent output end of the flow channel to form a jet stream of the cleaning fluid, the jet stream having a direction that varies with time and sweeps over the ferrule end face.

Another aspect of the disclosure is a method of cleaning a fiber end face of an optical fiber supported by a ferrule substantially at a ferrule end face. The method includes: a) positioning the ferrule relative to a nozzle that includes an inner flow channel so that an output end of the inner flow channel is spaced apart from and confronts the ferrule end face; b) directing a cleaning fluid through the inner flow channel, wherein the inner flow channel includes a converging taper that defines the output end of the inner flow channel; c) passing the cleaning fluid around a stationary flow disrupter element disposed within the inner flow channel upstream of the converging taper to form a disrupted flow; and d) forming a jet stream of cleaning fluid by passing the disrupted flow through the converging taper, wherein the jet stream has a time-varying direction that causes the jet stream to sweep over the ferule end face.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Figure 1A:
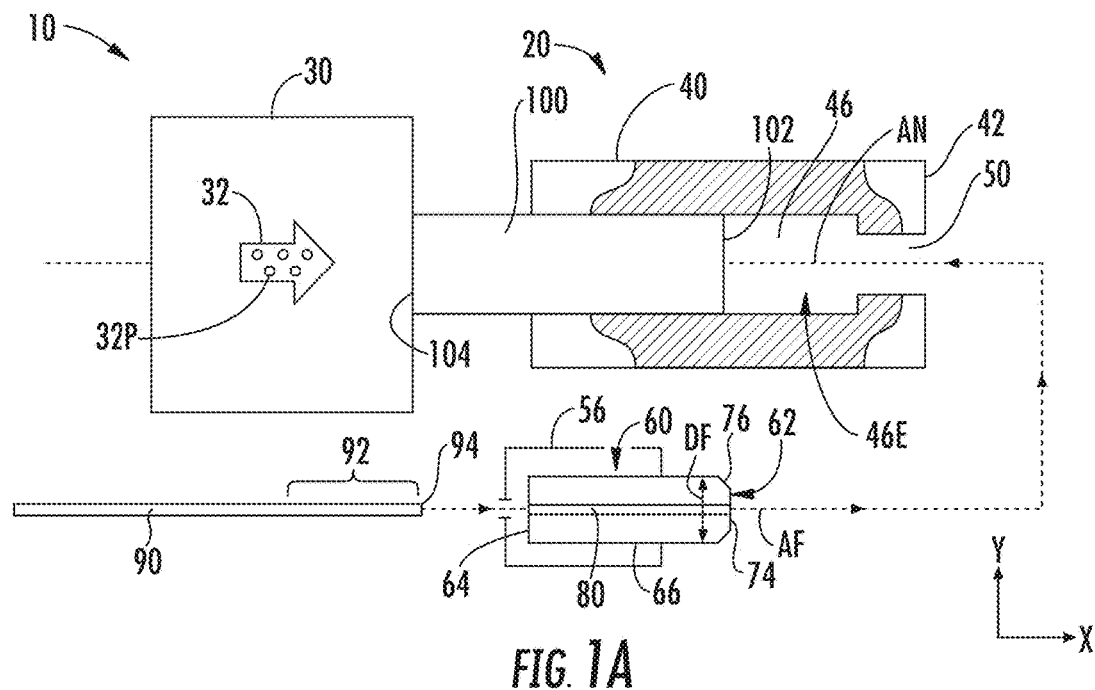
FIGS. 1A and 1B are schematic diagrams of an example cleaning system that employs the nozzle and nozzle assembly disclosed herein.
Figure 1B:
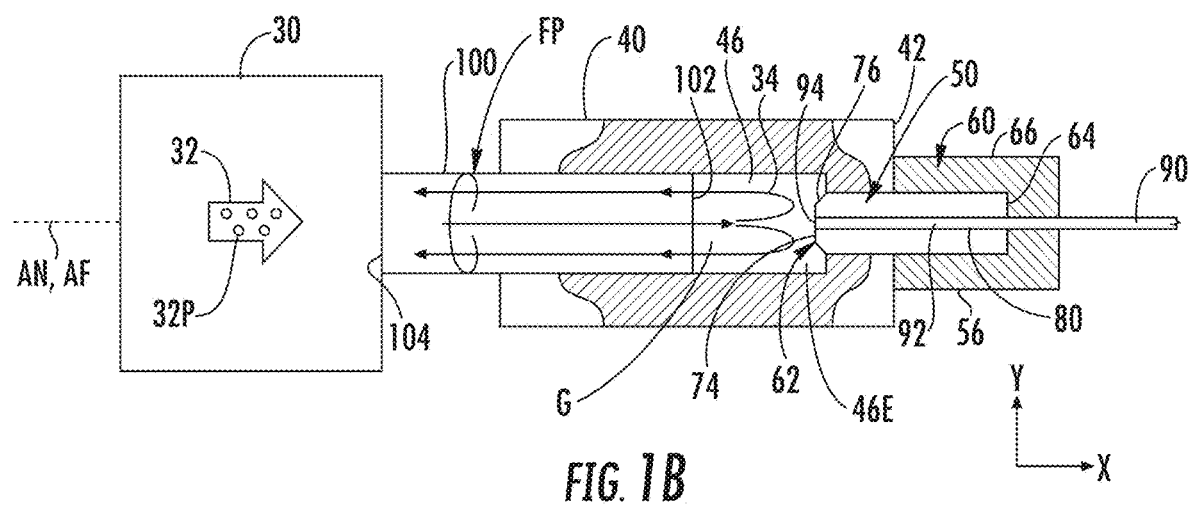

FIG. 1A is a partially exploded schematic diagram and FIG. 1B is a schematic diagram of an example cleaning system 10. The cleaning system 10 includes a nozzle assembly 20 fluidly attached to a cleaning fluid delivery device 30 that is configured to deliver a cleaning fluid 32. The cleaning fluid 32 can be a gas, a fluid, or a combination of a gas or fluid. An example cleaning fluid 32 includes or consists of air and a solvent. In an example, the cleaning fluid 32 can optionally include particles 32P, which can be combined with a gas, a fluid or a combination of the gas or fluid. Because such particles 32P are used for cleaning, they are referred to herein as "cleaning particles." Example cleaning particles 32P include for example frozen particles (e.g., ice) used in so-called "snow cleaning" applications.

The nozzle assembly 20 includes an adapter 40 having a front end 42 and an interior 46 configured to support a cleaning nozzle ("nozzle") 100. The interior 46 includes a front-end portion 46E closest to the front end 42. The nozzle 100 includes a nozzle axis AN, a front end 102 and a back end 104, with the back end fluidly coupled to the cleaning fluid delivery device 30. The nozzle 100 is described in greater detail below.

As best seen in FIG. 1A, the front end 42 of the adapter 40 includes a channel 50 open to the interior 46. The channel 50 is configured to support a ferrule 60, which in an example is part of an optical fiber connector 56. The optical fiber connector 56 can be any type of single-fiber or multi-fiber optical fiber connector (e.g., LC, SC, MPO, etc.) that utilizes at least one ferrule 60. The ferrule 60 includes a ferrule axis AF, a front end 62, a back end 64 and an outer surface 66. The ferrule front end 62 includes an end face 74, which optionally includes a chamfer 76 adjacent the outer surface 66. The ferrule 60 has a diameter DF. The end face 74 has an end-face diameter DE that excludes the chamfer 76 (see FIG. 3A). The ferrule 60 also includes an axial bore 80 that runs down the ferrule axis AF from the front end 62 to the back end 64.

The axial bore 80 supports a front-end section 92 of an optical fiber 90. The front-end section 92 of the optical fiber 90 includes an end face ("fiber end face") 94, which resides substantially at ferrule end face 74. As shown in FIG. 1B, the ferrule 60 is supported in the adapter channel 50 such that the ferrule axis AF is coaxial with the nozzle axis AN. Further, the ferrule end face 74 and the optical fiber end face 94 reside within the front-end portion 46E of adapter interior 46 and are spaced apart from the nozzle front end 102 so that the ferrule end face confronts and is spaced apart from a tip 180 of a nozzle inner housing 150 by an axial distance S (see FIGS. 3A and 3B; to be discussed below).

As shown in FIG. 1B, the nozzle assembly 20 defines a flow path FP for the cleaning fluid 32. The flow path FP runs from the cleaning fluid delivery device 30 through the nozzle 100 and through the front-end portion 46E of the adapter interior 46 to the ferrule end face 74. The flow path FP continues back through the nozzle 100 toward the cleaning fluid delivery device 30. The cleaning fluid 32 returning through the nozzle 100 may be diverted into a containment vessel (not shown) before reaching the cleaning fluid delivery device 30. In an example, the cleaning fluid delivery device 30 sets the inlet pressure P, i.e., the pressure of the cleaning fluid 32 as inputted into the back end 104 of the nozzle 100. In an example, the inlet pressure P is in the range from 5 psig to 80 psig. In an example where negative pressure (i.e., vacuum) is applied in the front-end portion 46E of the adapter interior 46, this negative pressure can be in the range from −1 psig to −5 psig.

As described in greater detail below, the cleaning fluid 32 is outputted from the nozzle front end 102 in the form of a jet stream 34. The jet stream 34 traverses the front-end portion 46E of the adapter interior 46 and impinges upon the ferrule end face 74 and the fiber end face 94. The shear force of the impingement jet stream 34, along with the optional chemicals in the solvent, acts to removes particles adhered to the ferrule end face 74 and the fiber end face 94. For an axisymmetric, normally impinging jet stream from a conventional nozzle, the shear force at the center of the ferrule end face 74 where the fiber end face 94 is located is relatively low due to the existence of a stagnation zone SZ (see FIG. 4A, introduced and discussed below). For a non-axisymmetric, off-center, or tilted impingement jet, the stagnation zone SZ still exists somewhere on the ferrule end face 74.

Figure 2:
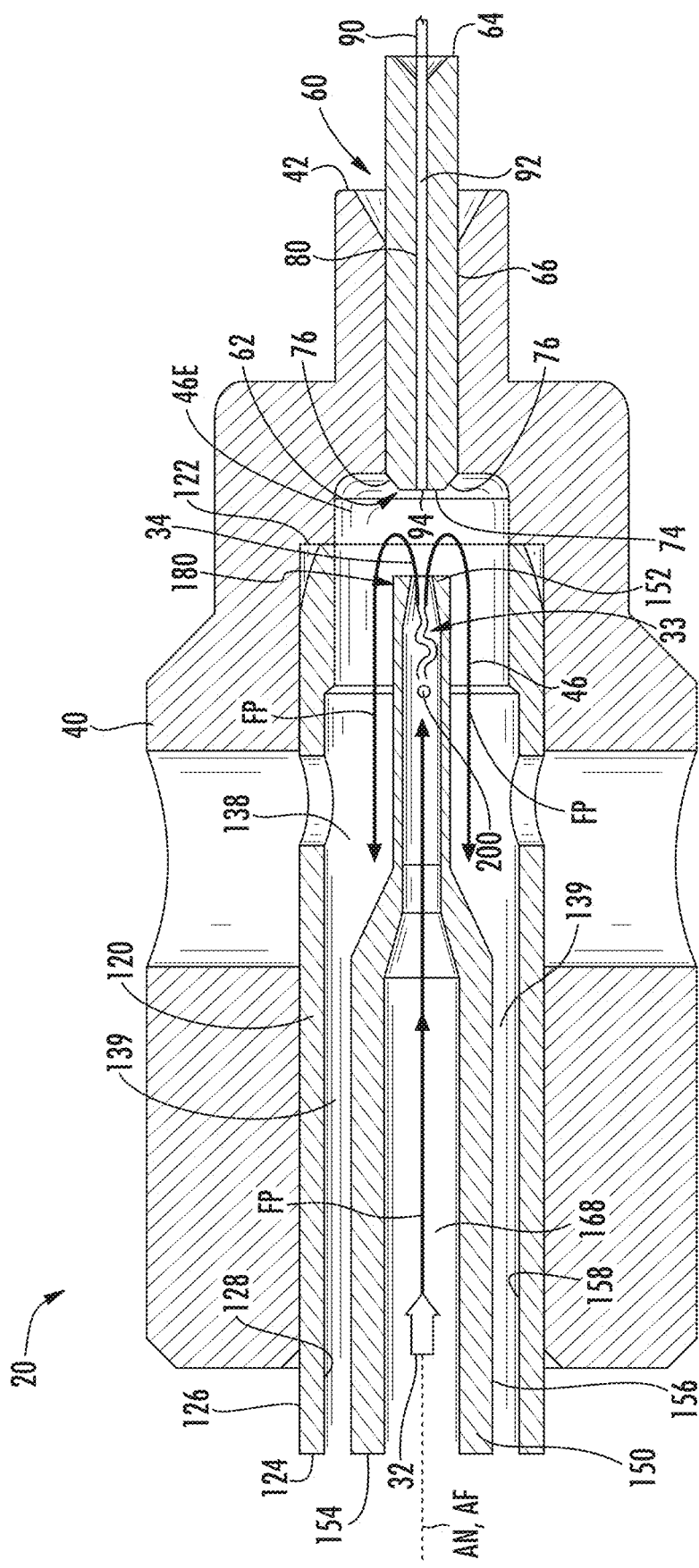
FIG. 2 is a cross-sectional view of an example of the nozzle assembly as disclosed herein.
Figure 3A:
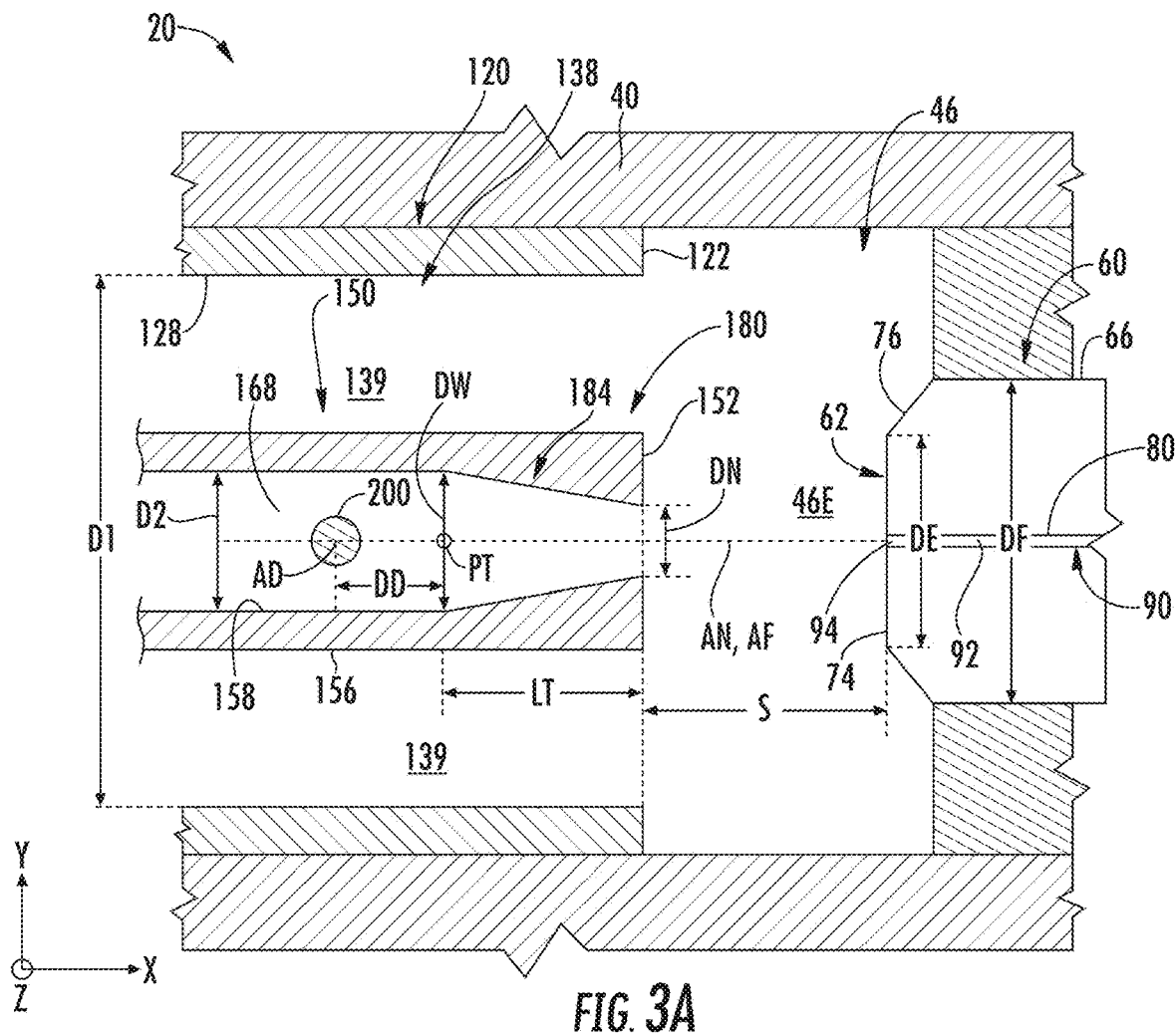
FIG. 3A is a close-up cross-sectional view of a front-end portion of the nozzle disclosed herein shown in relation to a front end of a ferrule as part of the nozzle assembly.

FIG. 2 is a cross-sectional view of an example nozzle 100 operably supported by the adapter 40 to define the nozzle assembly 20. The general flow path FP of the cleaning fluid 32 through the nozzle 100 is also shown. FIG. 3A is a close-up cross-sectional view of a front-end portion of the nozzle 100 and the front end 62 of the ferrule 60. Referring collectively to FIGS. 1A, 1B, 2, and 3A, the nozzle 100 has a central axis AN, a front end 102 and a back end 104. The back end 104 is configured to fluidly connect to the cleaning fluid delivery device 30. The nozzle 100 includes an outer housing 120 centered on nozzle axis AN. The outer housing 120 has a front end 122, a back end 124, an outer surface 126, and an inner surface 128. The inner surface 128 defines an interior ("outer housing interior") 138 of diameter D1. In an example, the outer housing 120 has a tubular configuration. In an example, the diameter D1 has a size relative to the ferrule diameter DF as defined by the relationship $(0.5)DF \le D1 \le (5)DF$.

The nozzle 100 also includes an inner housing 150 disposed within the outer housing interior 138 and centered on the nozzle axis AN. The inner housing 150 has a front end 152, a back end 154, an outer surface 156, and an inner surface 158. The inner surface 158 defines an interior ("inner housing interior") 168. The inner housing interior 168 has a diameter D2. As noted above, the front end 152 of the inner housing 150 is axially spaced apart from ferrule front end 62 by the axial distance S.

In the example shown, the inner housing 150 has a tubular configuration. Also in the example shown, the outer housing 120 and the inner housing 150 are concentrically arranged. Furthermore, the outer housing 120 and the inner housing 150 each have generally circular cross-sectional shapes. In other examples, the inner and/or outer housings 150 and 120 may have different configurations and/or be arranged in a different manner.

The inner housing interior 168 is also referred to herein as "inner flow channel" 168 because it supports the flow of the cleaning fluid 32 from the fluid delivery device 30 to the ferrule 60 over a portion of the flow path FP. The nozzle 100 also includes an outer flow channel 139 defined by the portion of the outer housing interior 138 between the inner housing outer surface 158 and the outer housing inner surface 128. The inner flow channel 168 and the outer flow channel 139 of the nozzle 100 are fluidly connected through the front-end portion 46E of the adapter interior 46 when the nozzle is used to form nozzle assembly 20. Thus, the flow path FP generally runs through the inner flow channel 168, then through the front-end portion 46E of the adapter interior 46, and then though the outer flow channel 139. In an example, the cross-sectional (annular) area of the outer flow channel 139 is greater than the cross-sectional area of the inner flow channel 168.

With continuing reference to FIG. 3A, the inner housing 150 includes a front-end section or tip 180 that includes the front end 152 of the inner housing. The tip 180 includes a front-end portion of the inner housing interior 168 that has a converging or narrowing taper 184, i.e., the taper narrows in the direction from the back end 154 to the front end 152, i.e., in the +x direction as shown, which is in the initial direction of the flow path FP through nozzle 100.

In an example, the taper 184 has a frustoconical shape. The taper 184 starts at an axial transition position PT and ends at the front end 152 of the inner housing. The taper 184 has wide diameter DW at the transition position PT and a narrow diameter DN at the front end 152. In an example, DW=D2. Also in an example, the narrow diameter DN of the taper 184 has a size relative to the end-face diameter DE of ferrule 60 as defined by the relationship $(0.5)DE \le DN \le (2)DE$. Also in an example, the diameter D2 of the inner flow channel 168 has a size relative to the narrow diameter DN of the taper 184 as defined by the relationship $(1.5)DN \le D1 \le (3)DN$. Also in an example, the axial distance S between the front end 152 of the nozzle inner housing 150 and the ferrule front end 62 has a size relative to the narrow diameter DN of the taper 184 as defined by the relationship $(0.5)DN \le S \le (5)DN$.

The taper 184 has an axial length LT as measured from the axial transition point PT to front end 152. Due to the taper 184, the tip 180 is convergent and so is referred to hereinafter as "convergent tip" 180. The convergent tip 180 also defines an output end of the inner flow channel 168 of the inner housing 150. The back end 154 of the inner housing 150 serves as an input end to the inner flow channel 168.

With continuing reference to FIGS. 2 and 3A, the flow path FP passes through the inner housing interior 168, through convergent tip 180 and into the front-end portion 46E of adapter interior 46. The flow path FP thus first moves in the +x direction and includes (i.e., passes over) the ferrule end face 74 and the fiber end face 94. The flow path FP then moves in the -x direction through the outer flow channel 139.

The nozzle 100 further includes at least one flow disrupter element 200 disposed within the interior 168 of the inner housing 150 upstream of convergent tip 180 (i.e., upstream of axial transition point PT) and within the flow path FP. In an example, only a single flow disrupter element 200 is employed, and this example is discussed below by way of illustration and for ease of discussion. In an example, the flow disrupter element has a unitary, monolithic structure, i.e., is a made of a single material and is not made by combining multiple components or parts.

The flow disrupter element 200 includes a central axis AD, which by way of example is shown as oriented in the z-direction. The central axis AD is located an axial distance DD from the axial transition point PT. In one example, the flow disrupter element 200 extends directly outward from the inner surface 158 of the inner housing 150 and into the portion of flow path FP that passes through the inner housing interior 168.

Figure 3B:
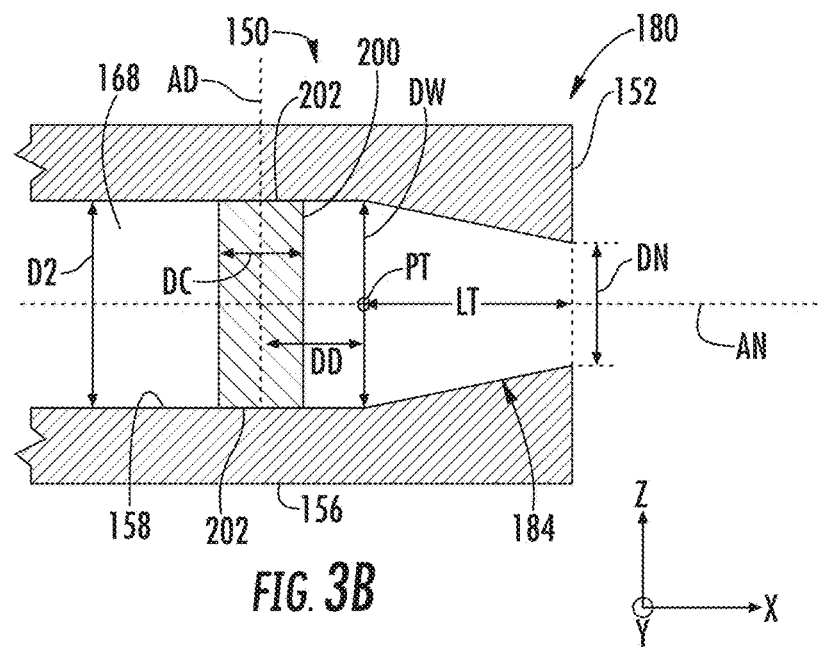
FIG. 3B is a close-up cross-sectional view of the front-end portion of the nozzle illustrating an example configuration of a flow disrupter element that spans an interior of a nozzle inner housing.

FIG. 3B is a close-up cross-sectional view of the convergent tip 180 of the nozzle 100 similar to that of FIG. 3A and illustrates an example wherein the flow disrupter element 200 spans the interior 168 of the nozzle inner housing 150. In this configuration, the flow disrupter element 200 extends all of the way across the portion of the flow path FP that passes through inner housing interior 168. In the example configuration of FIG. 3B, the central axis AD of the flow disrupter element 200 intersects the nozzle axis AN at a right angle.

The flow disrupter element 200 may have a cylindrical shape with a diameter DC, such as shown in FIG. 3B. The flow disrupter element 200 can also have round (circular) cross-sectional shape or other cross-sectional shape. As an example, the flow disrupter element 200 may not be cylindrical, e.g., may have an axial taper or more generally a width that varies along its central axis AD.

In the example shown, the flow disrupter element 200 is fixed in position, i.e., is stationary relative to the nozzle inner housing 150. This stationary feature results in nozzle 100 having no moving parts. In the example configuration of FIG. 3B, the flow disrupter element 200 includes opposite ends 202 that are respectively secured to opposite sides of the inner surface 158 of the inner housing 150. In an example, the term "stationary" does not preclude vibrations that can occur when the cleaning fluid 32 flows rapidly over the flow disrupter element 200. Such vibrations can occur, for example, when only one end 202 of the flow disrupter element 200 is secured to the inner surface 158 of the inner housing 150.

Figure 4A:
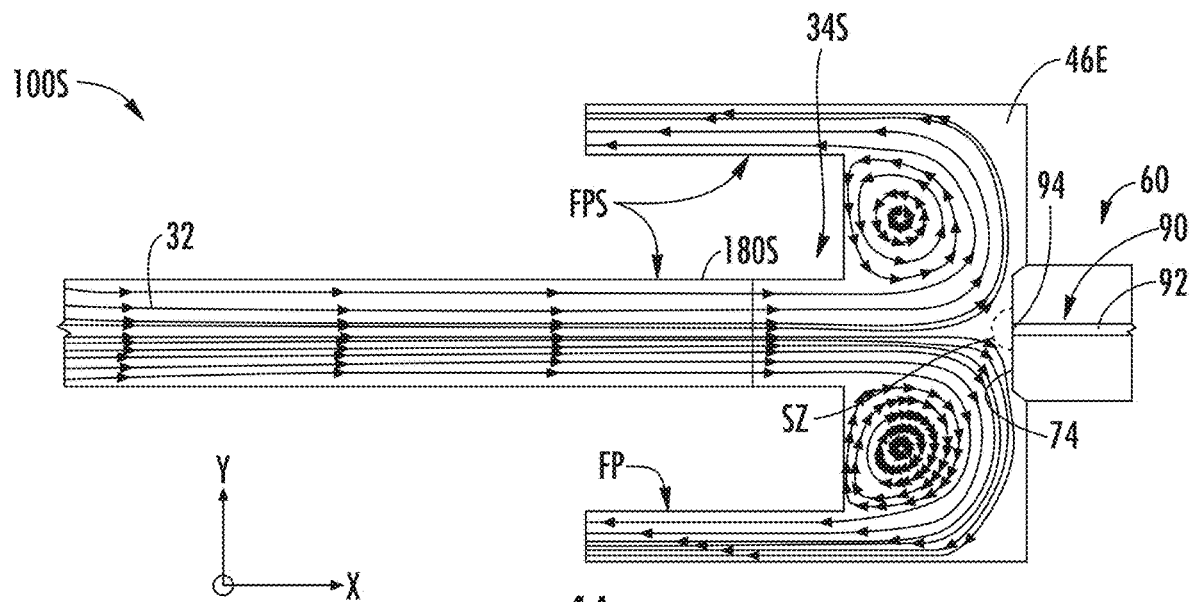
FIGS. 4A and 4B are schematic diagrams of the flow of cleaning fluid along a flow path for the prior-art case of a standard nozzle (FIG. 4A) and for the case of the nozzle disclosed herein that includes a flow disrupter element and a convergent tip (FIG. 4B), wherein the flow over the respective flow paths were determined using computational fluid dynamics computer simulations.
Figure 4B:
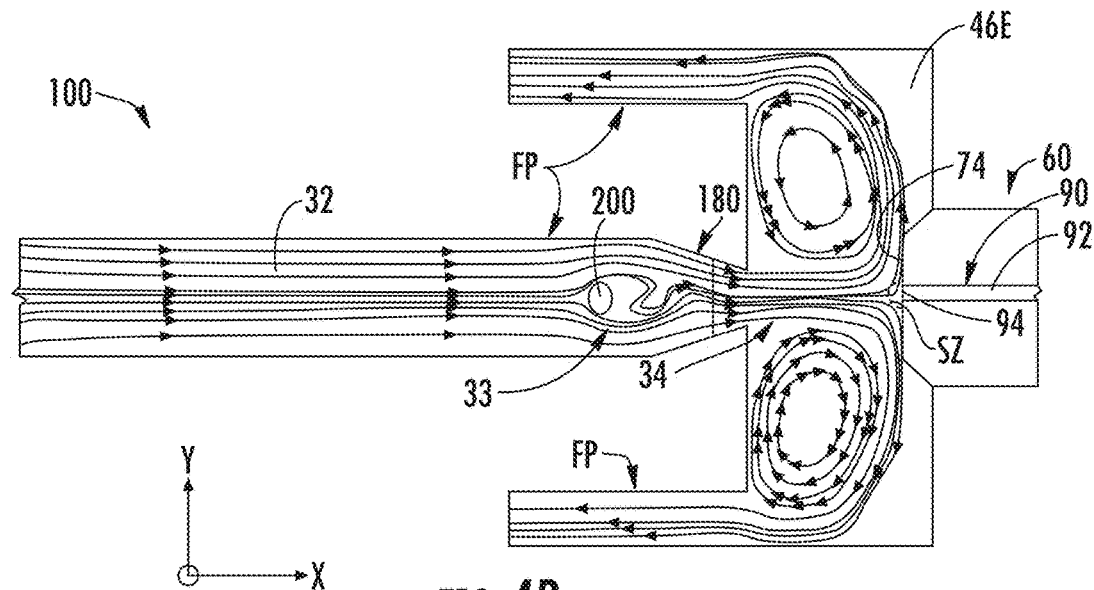

FIGS. 4A and 4B are schematic diagrams of the flow of cleaning fluid 32 along the flow path FP for the case of a standard prior art nozzle 100S with no flow disrupter element 200 and a standard tip 180S (FIG. 4A) and with the flow disrupter element 200 and convergent tip 180 (FIG. 4B) as disclosed herein. The schematic diagrams of FIGS. 4A and 4B are based on computer simulations using commercially available computational fluid dynamics software. The simulations were two-dimensional and used air as the cleaning fluid 32.

With reference to FIG. 4A, the flow of the cleaning fluid 32 follows a standard flow path FPS that results in a standard jet stream 34S that is generally laminar until it reaches the ferrule end face 74. The standard jet stream 34S travels in a fixed direction and defines a relatively large stagnation zone SZ for the standard flow path FPS along the ferrule axis AF where the fiber end face 94 resides. The stagnation zone SZ forms due to the pressure increase at the ferrule end face 74 on the ferrule axis AF, leading to a low shear force and thus a low local cleaning efficiency.

With reference to FIG. 4B, the flow disrupter element 200 is configured to disrupt the flow of cleaning fluid 32 along the flow path FP to form a disrupted flow 33 in the flow path on the downstream side of the flow disrupter element. The disrupted flow 33 in flow path FP results from flow separation and vortex shedding, which leads to substantially turbulent flow. The disrupted flow 33 passing through the convergent tip 180 results in the jet stream 34 having a much smaller stagnation zone SZ and a larger shear force, which provides greater local cleaning efficiency relative to the standard jet stream 34S.

The flow disrupter element 200 works in cooperation with the convergent tip 180 to generate a jet stream 34 whose direction varies with time. The shear force generated by the jet stream 34 also varies with time. It is noted here that the time variation of the shear force and the direction of the jet stream 34 can be accomplished with no moving parts in nozzle 100. It is further noted that the time variation of the shear force and of the direction of the jet stream 34 is not purely periodic and is quasi-periodic or chaotic. In an example, the time variation of the direction of the jet stream 34 has a frequency f on the order kHz, e.g., between 0.5 KHz and 100 kHz or 1 kHz to 10 kHz. Here, the frequency f is that of a random (or quasi-random) process and is determined using techniques known in the art of random processes.

Figure 5A:
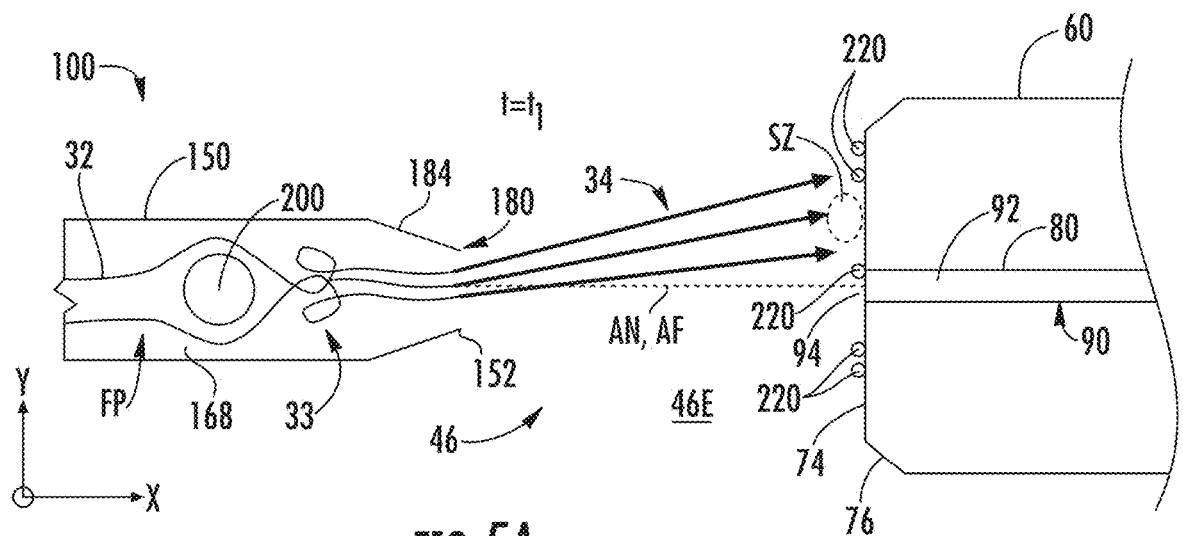
FIGS. 5A through 5C are schematic diagrams that illustrate the time-varying direction of the jet stream emanating from the nozzle front end at three different times $t_2$ and $t_3$, respectively.
Figure 5B:
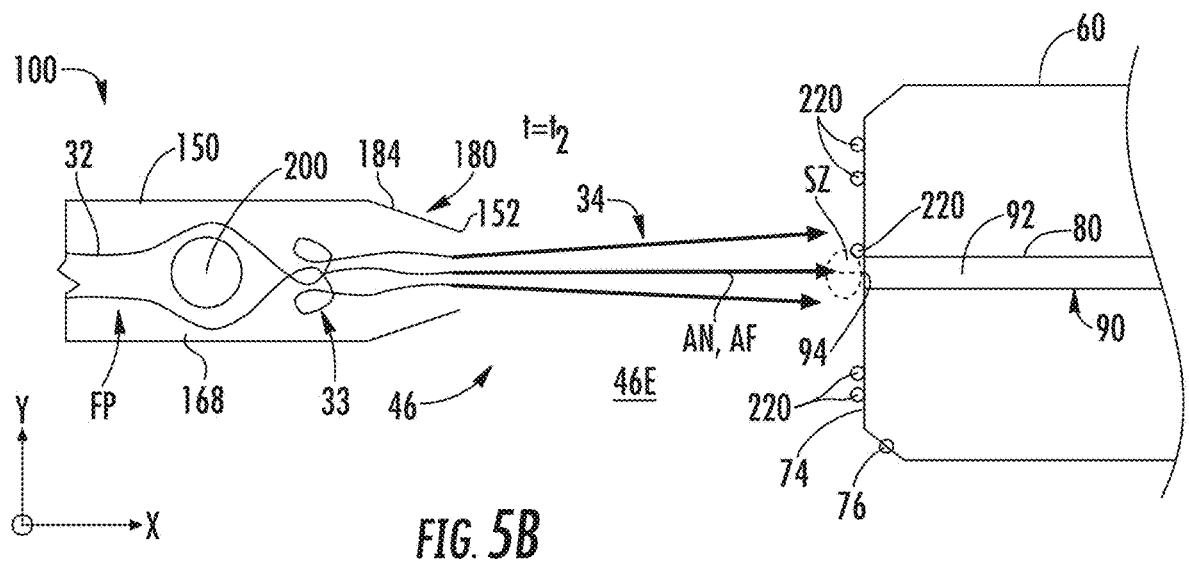
Figure 5C:
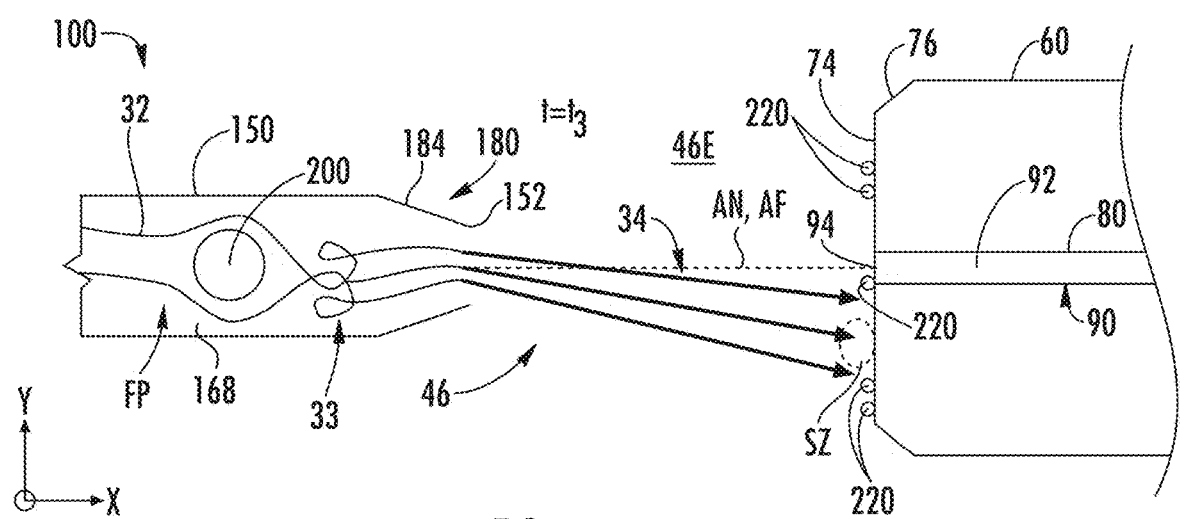

The FIGS. 5A through 5C are schematic diagrams that illustrate the time-varying direction of jet stream 34 emanating from convergent tip 180 at three different times $t_1$, $t_2$ and $t_3$, respectively. FIGS. 5A through 5C also schematically illustrate the disrupted flow region 33 in flow path FP. In an example, $t_2=t_1+\Delta t$ and $t_3=t_1+2\Delta t$. In an example, $\Delta t$ is a fraction of a second, e.g., between 0.1 second and 0.0001 second, or between 0.01 second and 0.001 second. Contaminants (e.g., particles) 220 are shown on the ferrule end face 74 and the fiber end face 94.

Because the direction of the jet stream 34 varies with time t, the jet stream sweeps over the ferrule end face 74, with the location of the stagnation zone SZ at the ferrule end face also varying with time (i.e., moving relative to the ferrule end face). This means that no one location on the ferrule end face 74, including the location on the ferrule axis AF, is subjected to the stagnation zone SZ for a significant length of time, e.g., no longer than a fraction of a second. For example, the stagnation zone SZ does not stay in the same place for longer than 0.1 second or for even shorter time periods such as, no longer than 0.01 second, no longer than 0.005 second, no longer than 0.001 second, or no longer than 0.0001 second. The amount of shear force provided by the jet stream 34 at the ferrule end face 74 is generally sufficient to dislodge and remove the usual types of contaminants 220 from the ferrule end face as well as from the fiber end face 94.

Figure 6A:
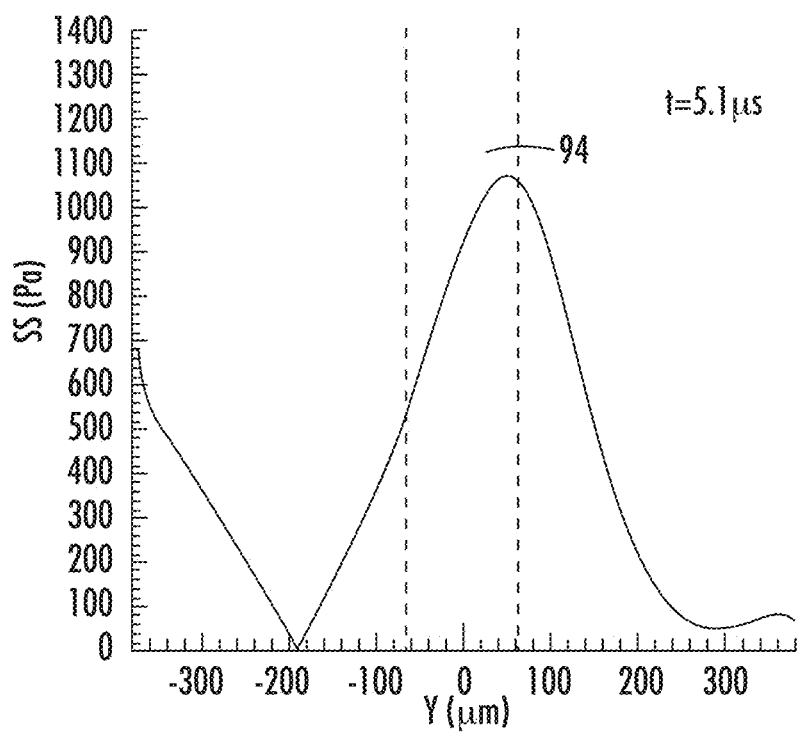
FIGS. 6A through 6D are plots of the shear stress SS (Pa) at the ferrule end face due to the jet stream of cleaning fluid versus the y position (μm) relative to the ferrule axis, wherein the plots are based on computational fluid dynamics computer simulations and represent four different times t=5.1 μs, t=14.7 μs, t=22.2 μs, and t=32.1 μs, respectively.
Figure 6B:
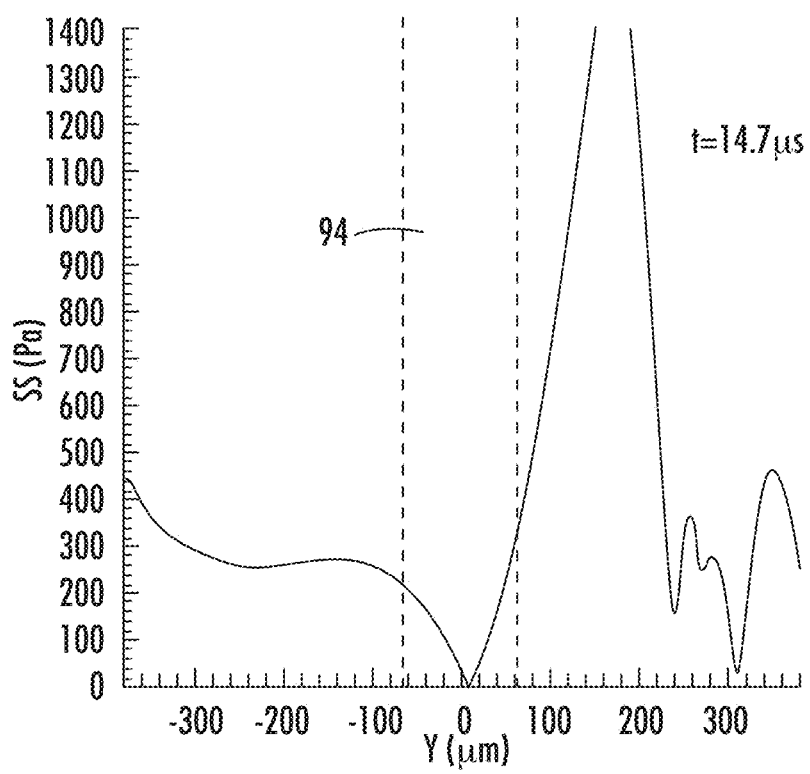
Figure 6C:
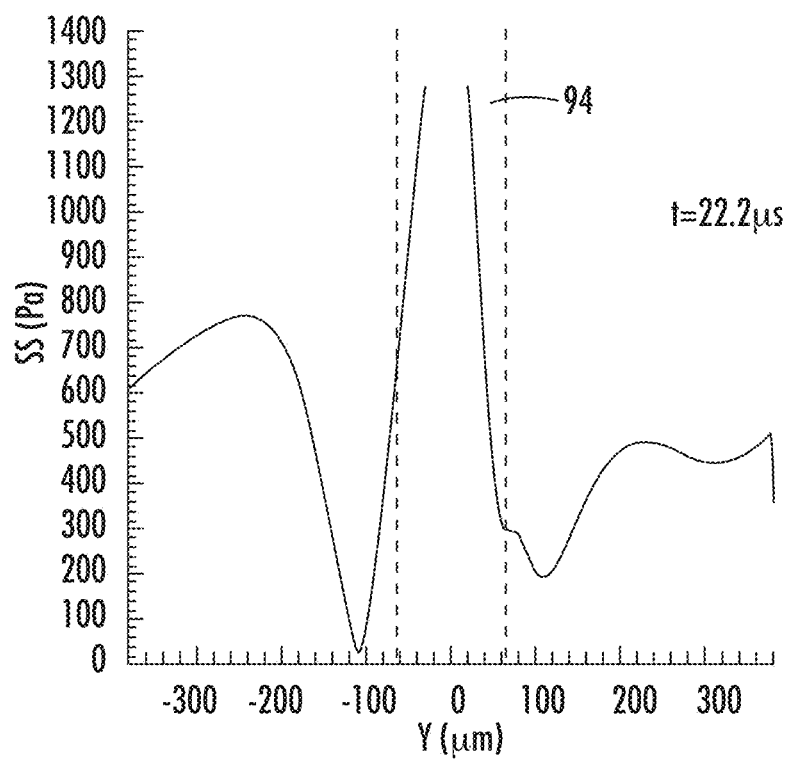
Figure 6D:
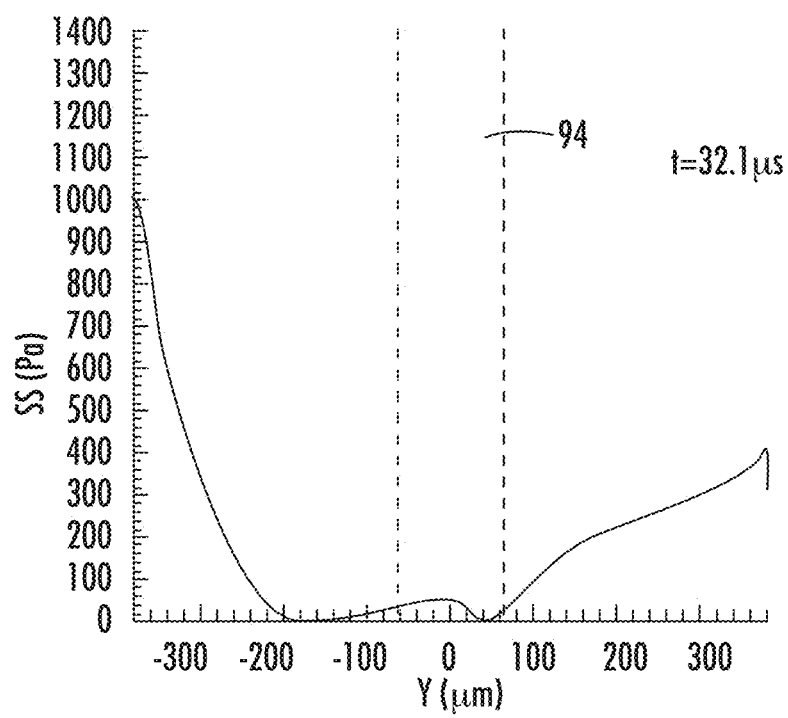

FIGS. 6A through 6D are plots of the shear stress SS (Pa) at the ferrule end face 74 due to the jet stream 34 versus the position y (μm) relative to the ferrule axis AF. The span of the fiber end face 94 at the ferrule end face 74 is indicated by dashed lines. The plots are based on computer simulations and are for different times t=5.1 μs (FIG. 6A), t=14.7 μs (FIG. 6B), t=22.2 μs (FIG. 6C) and t=32.1 μs (FIG. 6D). The simulations assumed the cleaning fluid 32 consisted of air only. The plots of FIGS. 6A through 6D show that the nozzle 100 can generate a rapid sweeping flow with relatively high shear stress SS on the ferrule end-face 74, which ensures high cleaning efficiency. The plots of FIGS. 6A through 6D also indicate that direction of the jet stream 34 (and thus its position on ferrule end face 74) can change substantially over a time period of about 10 μs, which corresponds to a frequency f of about 100 kHz.

When nozzle 100 is operated at a high inlet pressure P (e.g., a cleaning fluid velocity of 40 m/s), it generates the disrupted flow 33, which is converted to the jet stream 34 by passing through convergent tip 180. The jet stream 34 is unstable and so its direction randomly (or quasi-randomly) varies at relatively high frequency f to sweep the cleaning fluid 32 over the ferrule end face 74. The plots of FIGS. 6A and 6C show how the sweeping flow pushes the stagnation zone SZ away from the fiber end face 94 so that the shear stress SS is relatively high at the fiber end face. The plots of FIGS. 6B and 6D show that the stagnation zone SZ can reside at the fiber end face 94, which leads to a relatively low shear stress SS at the fiber end face. Since the sweeping flow has very high frequency (in the order of kHz), the fiber end face 94 can be cleaned within a short amount of operating time, e.g., within 1 second or within a fraction of a second.

Figure 7:
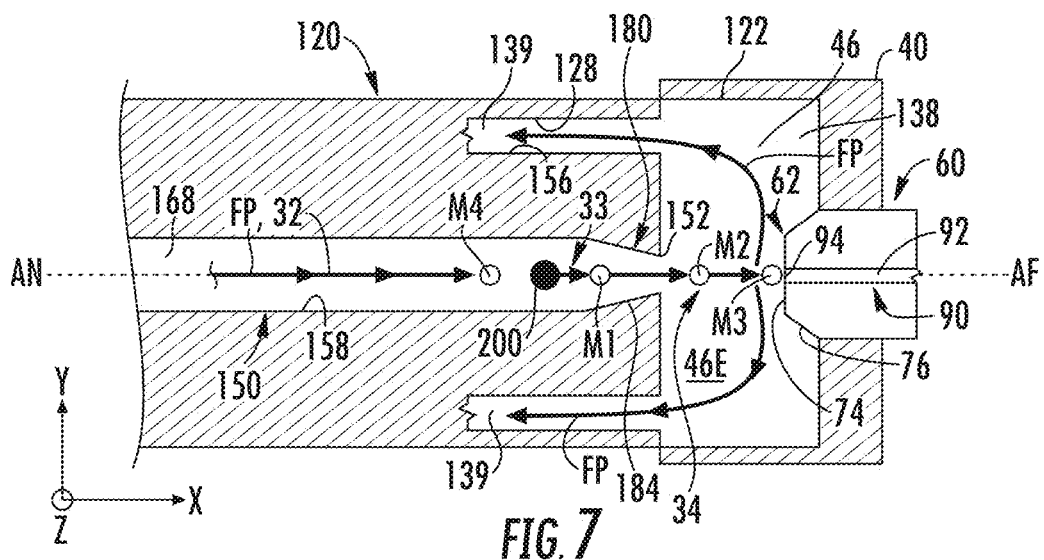
FIG. 7 is a partial cut-away schematic diagram of the nozzle assembly illustrating the location of four (virtual) fluid velocity monitors M1 through M4 used to perform computational fluid dynamics computer simulations of the flow of cleaning fluid over the portion of the flow path FP.
Figure 8A:
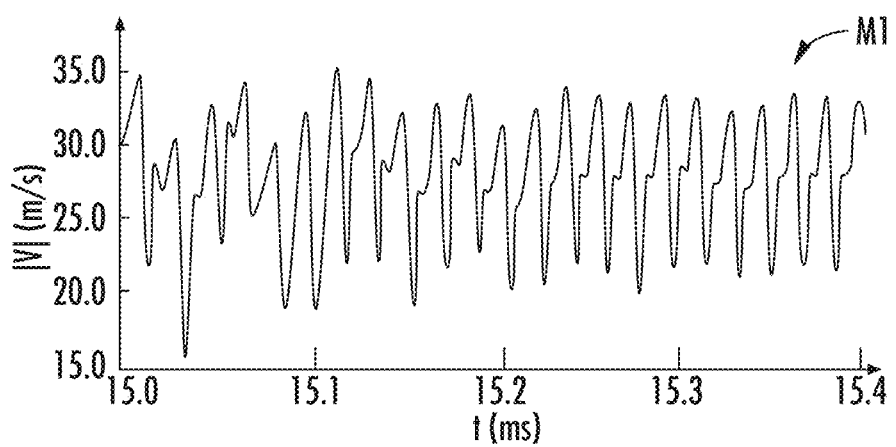
FIGS. 8A through 8D are plots of the velocity magnitude |V| (meters per second, m/s) versus time t (milliseconds, ms) for monitors M1 through M4, respectively, as calculated using a computational fluid dynamics computer simulation of the flow path.
Figure 8B:
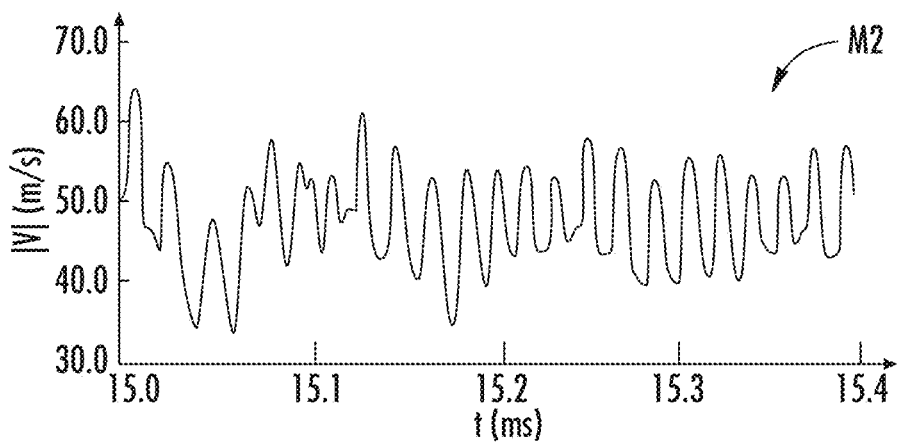
Figure 8C:
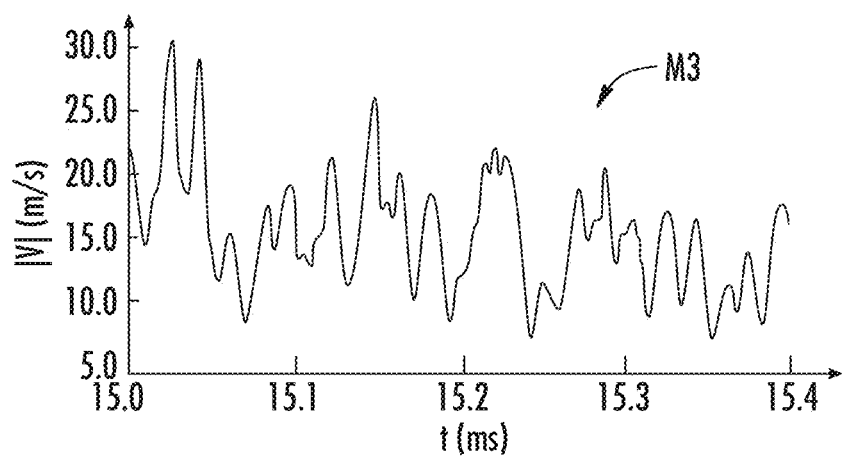
Figure 8D:
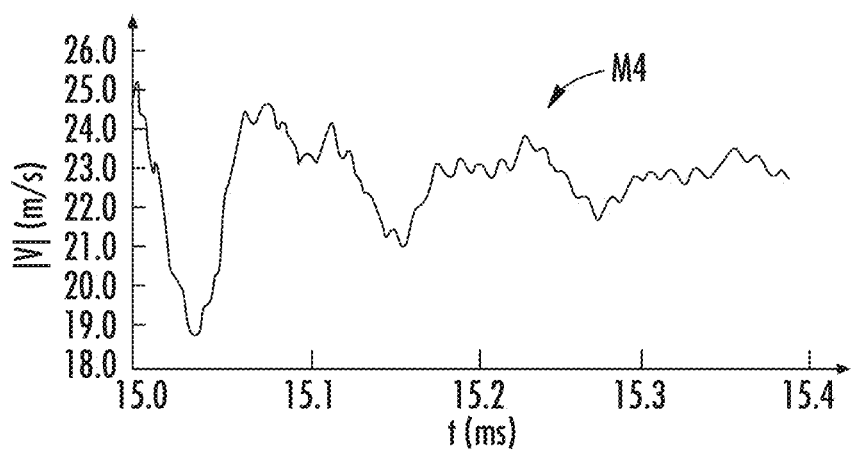
Figure 9:
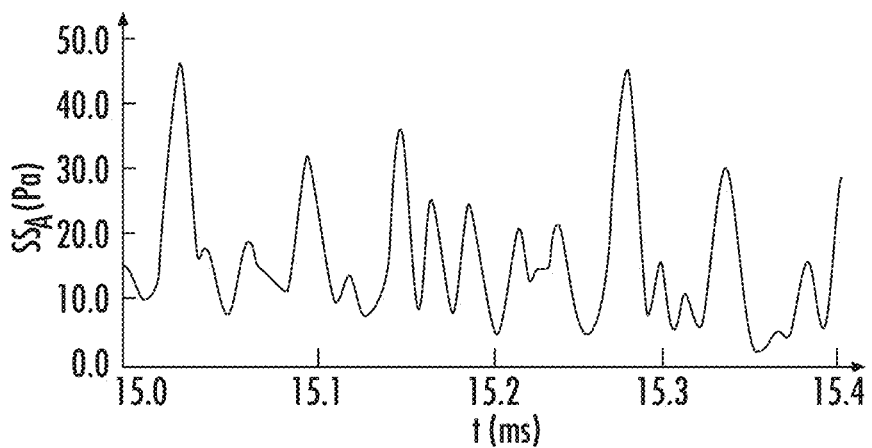
FIG. 9 is a plot of the average shear stress $SS_A$ (Pa) at the fiber end face versus time t (ms) based on the computer simulations used to generate the plots of FIGS. 8A through 8D.

FIG. 7 is a partial cut-away schematic diagram of the nozzle assembly 20 illustrating the location of four (virtual) fluid velocity monitors M1 through M4 used to perform additional computer simulations of the flow of cleaning fluid 32 over the flow path FP. FIGS. 8A through 8D are plots of the velocity magnitude |V| (m/s) versus time t (milliseconds, ms) at monitors M1 through M4, respectively. FIG. 9 is plot of the average shear stress $SS_A$ (Pa) at the fiber end face 94 versus time t (ms) based on the computer simulations used to generate the plots of FIGS. 8A through 8D.

The plots of monitored velocity magnitudes |V| as measured at locations M1, M2 and M3 downstream of the flow disrupter element 200 (FIGS. 8A, 8B and 8C, respectively), show relatively strong periodic velocity fluctuations. The plot of FIG. 8D for the velocity magnitude |V| at monitor M4, which is upstream of the flow disrupter element 200, does not show the strong velocity associated with the downstream monitors M1, M2 and M3. As noted above, as the flow path FP passes over the flow disrupter element 200, vortex shedding occurs, thereby forming the disrupted flow 33. The disrupted flow 33 passing through the convergent tip 180 leads to the formation of jet stream 34 and the time variation in the shear force and in the direction of the jet stream.

The convergent tip 180 focuses the jet stream 34 towards the center (on-axis location) of the ferrule end face 74, thus amplifying the sweeping strength of fiber end face 94. The focused jet stream 34 from the nozzle 100 disclosed herein also has a smaller stagnation zone SZ than that formed using a standard nozzle 100S (see FIGS. 4A and 4B). The example simulations used to generate FIGS. 8A through 8D show that the sweeping flow of the jet stream 34 can have a frequency f of about 20 kHz, and the induced average shear stress SS across the entire fiber end face 94 can fluctuate between 2.0 and 47.4 Pa. FIG. 9 indicates that the average shear stress $SS_A$ over the entire time range is about 16.1 Pa.

In comparison, the corresponding shear stress of a standard nozzle 100S that does not have the flow disrupter element 200 and convergent tip 180 is only about 1.5 Pa. Thus, for the same operating conditions, the nozzle 100 can increase the cleaning force by about 10 times as compared to the standard nozzle 100S.

Figure 10A:
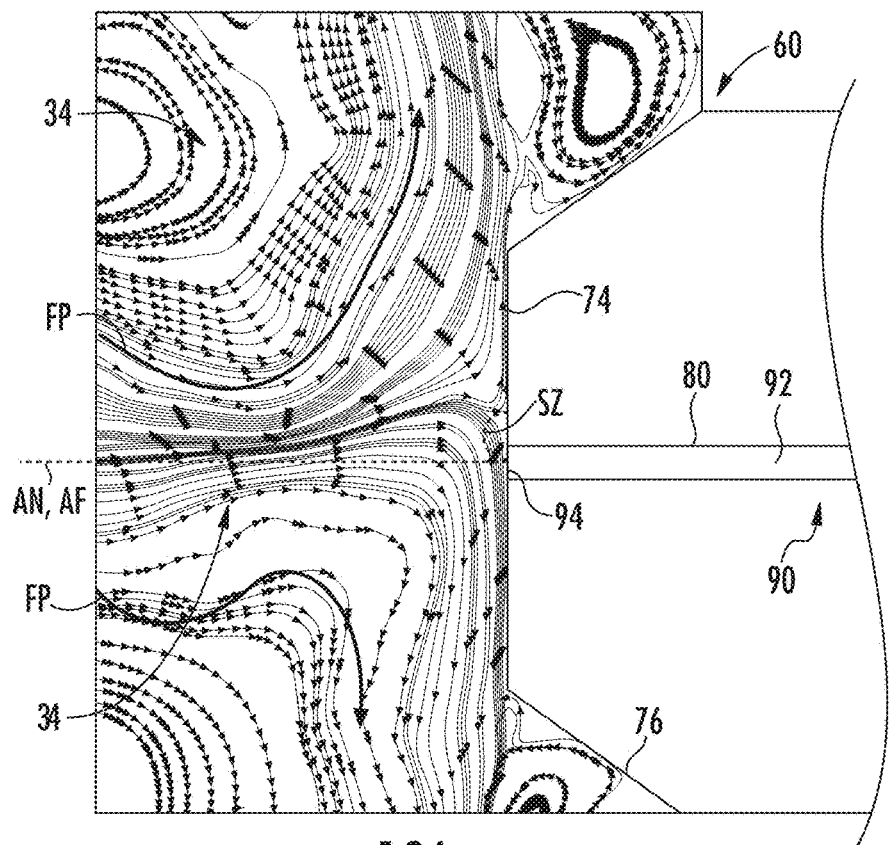
FIGS. 10A and 10B are close-up diagrams of the flow path contours of the jet stream as generated by the nozzle as disclosed herein (FIG. 10A) and for the prior-art standard nozzle (FIG. 10B) as calculated using computational fluid dynamics computer simulations.
Figure 10B:
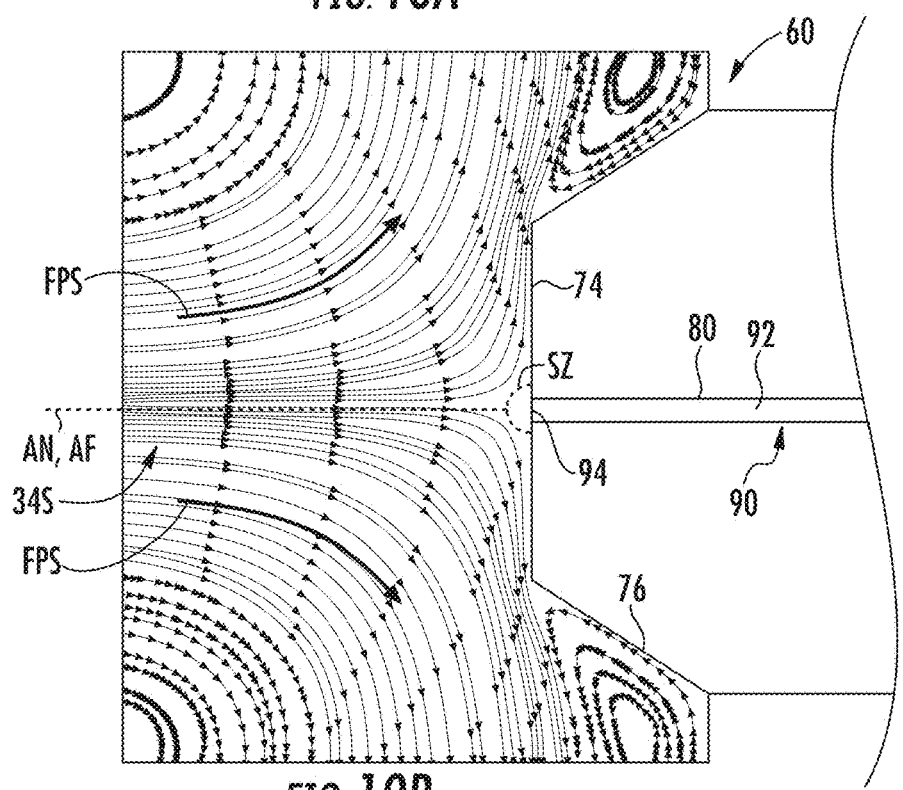

As the flow velocity of the cleaning fluid 32 increases, the sweeping frequency f of the jet stream 34 increases accordingly. In addition, the sweeping motion can be enhanced by a high inlet velocity as well. When the inlet velocity of the cleaning fluid 32 increases to 40 m/s, the nozzle 100 can induce strong sweeping flow that cleans the entire fiber surface, as indicated by the cleaning fluid flow contours of the flow simulation diagram of FIG. 10A. In contrast, increasing the inlet velocity for a standard nozzle 100S does not show significant improvement in reducing the size of the stagnation zone SZ, as illustrated by the cleaning fluid flow contours in the flow simulation diagram of FIG. 10B for the standard (prior art) nozzle.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of cleaning a fiber end face of an optical fiber supported by a ferrule substantially at a ferrule end face, comprising:
   flowing a cleaning fluid through a flow channel from an input end of the flow channel toward a convergent output end of the flow channel;
   flowing the cleaning fluid around at least one flow disrupter element that resides stationary in the flow channel to form a disrupted flow of the cleaning fluid; and
   passing the disrupted flow of the cleaning fluid through the convergent output end of the flow channel to form a jet stream of the cleaning fluid, the jet stream having a direction that varies with time and sweeps over the ferrule end face;
   wherein the time-varying direction of the jet stream varies with a frequency f in the range from 0.5 kHz to 100 kHz.

2. The method according to claim 1, wherein the cleaning fluid:
   a) consists of a gas;
   b) consists of a solvent;
   c) comprises a mixture of a gas and a solvent; or
   d) comprises cleaning particles and at least one of a gas and a solvent.

3. The method according to claim 1, wherein the jet stream generates a shear force at the ferrule end face that varies with time.

4. The method according to claim 1, wherein the jet stream defines a stagnation zone at the ferrule end face, and wherein the stagnation zone moves relative to the ferrule end face.

5. The method according to claim 1, wherein the at least one disrupter element consists of a single disrupter element.

6. The method according to claim 1, further comprising supporting the ferrule in an optical fiber connector.

7. A method of cleaning a fiber end face of an optical fiber supported by a ferrule substantially at a ferrule end face, comprising:
   a) positioning the ferrule relative to a nozzle that includes an inner flow channel so that an output end of the inner flow channel is spaced apart from and confronts the ferrule end face;
   b) directing a cleaning fluid through the inner flow channel, wherein the inner flow channel includes a converging taper that defines the output end of the inner flow channel;
   c) passing the cleaning fluid around a stationary flow disrupter element disposed within the inner flow channel upstream of the converging taper to form a disrupted flow; and
   d) forming a jet stream of cleaning fluid by passing the disrupted flow through the converging taper, wherein the jet stream has a time-varying direction that causes the jet stream to sweep over the ferule end face;
   wherein the time-varying direction of the jet stream varies with a frequency f in the range from 0.5 kHz to 100 kHz.

8. The method according to claim 7, wherein the cleaning fluid:
   i) comprises at least one of a gas and a solvent; or
   ii) comprises cleaning particles and at least one of a gas and a solvent.

9. The method according to claim 7, wherein the ferrule end face includes contaminants and wherein the method further comprises the jet stream imparting an amount of shear force to the ferrule end face sufficient to remove the contaminants.

10. The method according to claim 7, wherein the inner flow channel is defined by an inner surface of an inner housing that also includes an outer surface, and further comprising after act d):
    removing the cleaning fluid through an outer flow channel defined by the outer surface of the inner housing and an inner surface of an outer housing that surrounds the outer surface of the inner housing.

* * * * *